(12) United States Patent
Luvisotto et al.

(10) Patent No.: US 12,316,445 B2
(45) Date of Patent: May 27, 2025

(54) CHANNEL ASSIGNMENT IN A WIRELESS COMMUNICATION SYSTEM

(71) Applicant: Hitachi Energy Ltd, Zürich (CH)

(72) Inventors: Michele Luvisotto, Västerås (SE); Zhibo Pang, Västerås (SE); Xiaolin Jiang, Västerås (SE); Roger Jansson, Västerås (SE); Marek Czepulonis, Cracow (PL)

(73) Assignee: Hitachi Energy Ltd, Zürich (CH)

( * ) Notice: Subject to any disclaimer, the term of this patent is extended or adjusted under 35 U.S.C. 154(b) by 0 days.

(21) Appl. No.: 17/796,477

(22) PCT Filed: Jan. 29, 2021

(86) PCT No.: PCT/EP2021/052166
§ 371 (c)(1),
(2) Date: Jul. 29, 2022

(87) PCT Pub. No.: WO2021/152132
PCT Pub. Date: Aug. 5, 2021

(65) Prior Publication Data
US 2023/0353275 A1 Nov. 2, 2023

(30) Foreign Application Priority Data
Jan. 31, 2020 (EP) .................................... 20154811

(51) Int. Cl.
*H04L 1/00* (2006.01)
*H04W 16/14* (2009.01)

(52) U.S. Cl.
CPC ........... *H04L 1/0026* (2013.01); *H04W 16/14* (2013.01)

(58) Field of Classification Search
CPC .............. H04W 16/14; H04W 72/0453; H04L 27/0006; H04L 1/0026
See application file for complete search history.

(56) References Cited

U.S. PATENT DOCUMENTS 5,901,357 A * 5/1999 D'Avello ............ H04W 72/563
455/452.2
7,123,906 B1 * 10/2006 Otterbeck ......... H04M 1/72502
379/211.01
(Continued)

FOREIGN PATENT DOCUMENTS

CN 101611571 A 12/2009
CN 102027795 A 4/2011
(Continued)

OTHER PUBLICATIONS

ETSI; "Reconfigurable Radio Systems (RRS); Feasibility study on temporary spectrum access for local high-quality wireless networks"; Feb. 2018; ETSI TR 103 588 V1.1.1, pp. 1-30. (Year: 2018).*

(Continued)

*Primary Examiner* — Robert C Scheibel
(74) *Attorney, Agent, or Firm* — Slater Matsil, LLP (57) ABSTRACT

In one embodiment, a method can be performed by a network controller of the wireless communication system. The method includes classifying each available channel in the wireless communication system into one of multiple channel categories according to performance and usability characteristics of each available channel. The method also includes ranking the channels per each category and assigning, according to the channels as ranked, at least one of the channels to each of the end-nodes. The method includes providing, in a channel list and to the end-nodes, information of which at least one channel has been assigned to each end-node.

19 Claims, 6 Drawing Sheets

(56) References Cited

U.S. PATENT DOCUMENTS

| | | |
|---|---|---|
| 7,577,437 B1 | 8/2009 | Friman et al. |
| 2003/0054829 A1 | 3/2003 | Moisio |
| 2007/0263566 A1 | 11/2007 | McHenry et al. |
| 2008/0137620 A1 | 6/2008 | Wang et al. |
| 2008/0311925 A1* | 12/2008 | Kogawa ............... H04W 72/56 455/512 |
| 2009/0161610 A1 | 6/2009 | Kang et al. |
| 2009/0285165 A1 | 11/2009 | Berglund et al. |
| 2010/0069013 A1 | 3/2010 | Chaudhri et al. |
| 2010/0118796 A1 | 5/2010 | Yi et al. |
| 2010/0173586 A1* | 7/2010 | McHenry ............. H04W 16/14 455/62 |
| 2013/0059614 A1* | 3/2013 | Kannan ............... H04W 72/563 455/500 |
| 2013/0077597 A1 | 3/2013 | Nukala et al. |
| 2014/0314040 A1 | 10/2014 | Wang |
| 2015/0257152 A1* | 9/2015 | Hasegawa ............ H04W 16/14 370/329 |
| 2019/0166606 A1 | 5/2019 | Kalderen et al. |
| 2020/0120033 A1* | 4/2020 | Wolberg ........... H04W 28/0205 |

FOREIGN PATENT DOCUMENTS

| | | |
|---|---|---|
| CN | 103891381 A | 6/2014 |
| JP | 2002528013 A | 8/2002 |
| JP | 2003517802 A | 5/2003 |
| JP | 2008072381 A | 3/2008 |
| JP | 2009033647 A | 2/2009 |
| JP | 2015204551 A | 11/2015 |
| WO | 2014065002 A1 | 5/2014 |
| WO | 2018071456 A1 | 4/2018 |

OTHER PUBLICATIONS

Hossian, M., et al., "Channel Ranking Algorithms for Cognitive Coexistence of IEEE 802.15.4", 2009 IEEE 20th International Symposium on Personal, Indoor and Mobile Radio Communications, Tokyo, Japan, Sep. 13-16, 2009, pp. 112-116.

Song, Y., et al., "ProSpect: A Proactive Spectrum Handoff Framework for Cognitive Radio Ad Hoc Networks without Common Control Channel", IEEE Transactions on Mobile Computing, vol. 11, No. 7, Jul. 2012, pp. 1127-1139.

Yi, P., et al., "Developing ZigBee Deployment Guideline Under WiFi Interference for Smart Grid Applications", IEEE Transactions on Smart Grid, vol. 2, Issue 1, Mar. 2011, pp. 110-120.

Chakraborty, S., et al., "Dynamic Channel Allocation in IEEE 802.11 Networks", International Journal of Computer Applications (0975-8887), vol. 149, No. 1, Sep. 2016, total 4 pages.

Skokowski, P., et al., "Adaptive Channels' Selection for Hierarchical Cluster Based Cognitive Radio Networks", 8th International Conference on Signal Processing and Communication System, ICSPCS-2014, Dec. 15-17, 2014, total 8 pages.

\* cited by examiner

CHANNEL ASSIGNMENT IN A WIRELESS COMMUNICATION SYSTEM

CROSS-REFERENCE TO RELATED APPLICATIONS

This application is a national stage application of International Application No. PCT/EP2021/050548, filed on Jan. 13, 2021, which claims priority to European Patent Application No. 20154894.8, filed on Jan. 31, 2020, which applications are hereby incorporated herein by reference.

TECHNICAL FIELD

Embodiments presented herein relate to channel assignment in a wireless communication system.

BACKGROUND

Industrial communication systems are used in the automation of power systems, for example in substation automation or grid automation. To enhance the flexibility and scalability as well as to reduce the costs, it is convenient to replace wired networks (e.g., Ethernet-based networks) with wireless networks. Since a wireless channel is inherently shared and heavily dependent on the environment, any wireless communication system is prone to suffer from interference, malicious jamming, and fading, which can be generally described as bad channel states. When messages are, via signals, transmitted over such a wireless channel, the receiver may fail to decode the messages, resulting in a high error rate, which ultimately threatens the availability and reliability requirements posed by the industrial communication system.

To guarantee the performance in a wireless communication system, transmission might be performed in parallel over several wireless channels for the same application. Thus, when one of the wireless channels is impaired, the transmission can be switched to another of the wireless channels. Before switching to a new wireless channel, the state of the available wireless channels should be checked. However, the time required for performing constant channel monitoring should not impact the latency requirements of the system.

Further, if two or more devices transmit simultaneously on the same frequency band, their transmissions will collide, likely preventing the target receivers to decode them correctly. For this reason, there should be a mechanism in the wireless communication system configured to detect interference and switch the transmission from one or more of the devices to another clear channel. If such a switching mechanism is adopted, whenever the interference occurs the communication will be interrupted for a certain amount of time until the transmitter and receiver both adapt to a new channel, which may cause performance degradation or even safety hazards to the industrial operations. While identifying alternative available channels and agreeing on them is important, adapting the channel on both ends of a communication link in a fast and robust way is also needed to avoid performance degradation.

To guarantee safety, availability, and performance of industrial wireless communication systems, a proactive monitoring and ranking mechanism for wireless channels might be used to enable fast switching of transmissions to a channel in a good state as soon as the bad state of the current channel is detected.

Several wireless standards that use shared bandwidth and cognitive radio technologies have proposed different approaches to dynamically allocate, or assign, channels; within the present disclosure the terms allocate and assign can be used interchangeably. For example, according to the IEEE 802.11 protocol suite, dynamic channel allocation is often proposed to minimize interference between coexisting networks, by calculating a cost metric for a group of access points to achieve the optimized overall performance (see, Chakraborty, S., Saha, B., and Bandyopadhyay, S., "Dynamic channel allocation in IEEE 802.11 networks," in International Journal of Computer Applications, vol. 149, pp. 36-38, 2016). In IEEE 802.15.4-based networks, channel ranking algorithms are used to rank the channels based on the interference signal strength and activity level (see, Hossian, M. A., Mahmood, A., and Jantti, R., "Channel ranking algorithms for cognitive coexistence of IEEE 802.15. 4," IEEE 20th International Symposium on Personal, Indoor and Mobile Radio Communications, 2009). Also in cognitive radio networks the channels are ranked based on the channel activity level and power level, and spectrum distance (see, Skokowski, P., Malon, K., Kelner, J. M., Dolowski, J., Lopatka, J., and Gajewski, P., "Adaptive channels' selection for hierarchical cluster based cognitive radio networks," 8th International Conference on Signal Processing and Communication Systems (ICSPCS), 2014).

The above mentioned dynamic channel allocation and ranking schemes are typically limited to only one frequency band. Further, these schemes can only provide best-effort performance. For some industrial applications that require very high safety, availability, and reliability performance, there can be scenarios when in the current frequency band there is no channel available, effectively preventing those schemes to guarantee the required performance.

The availability of communication hardware configured to effectively transmit on several different frequency bands of the frequency spectrum, such as software-defined radios (SDRs) and wideband antennas, open the possibility of more advanced channel monitoring and ranking schemes, that will be better suited against extreme scenarios such as strong external interference or malicious jamming. However, when operating in different frequency bands, spectrum licensing and regulations should also be considered in addition to signal quality.

Further, the majority of wireless standards relating to operation in unlicensed, or license free, frequency bands or cognitive radio frameworks adopt some approach for channel switching to avoid interfering or being interfered. For example, since channels used in Zigbee and channels used in wireless local area networks (WLAN) overlap with each other, beacons carrying control information are used in Zigbee to coordinate channel switching, which has a considerable impact on latency (see, Yi, P., Iwayemi, A., and Zhou, C., "Developing ZigBee deployment guideline under WiFi interference for smart grid applications," IEEE transactions on smart grid, vol. 2, pp. 110-120, 2010). Cognitive radio systems also apply channel handoff by broadcasting the selected new channel one by one to avoid interfering the primary users, and the handoff delay can reach several milliseconds (see, Song, Y., and Xie, J., "ProSpect: A proactive spectrum handoff framework for cognitive radio ad hoc networks without common control channel," IEEE Transactions on Mobile Computing, vol. 11, pp. 1127-1139, 2012).

One common drawback of these procedures for channel switching is the large amount of time required by their implementation, resulting in a significant time gap (often in the order of several milliseconds or even longer) during which messages cannot be exchanged. In time-critical scenarios such as the control of power systems, the update rates requested to the network are so high (in the order of hundreds of microseconds), that there is no possibility to tolerate such a long gap in the communication.

Hence, there is still a need for improved mechanisms for efficient utilization of available channels for devices communicating in a wireless communication system.

SUMMARY

Embodiments presented herein relate to a method, a network controller, a computer program, and a computer program product for assigning channels to end-nodes in a wireless communication system.

Embodiments can provide efficient assignment of channels to devices, d in particular embodiments to end-nodes, communicating in a wireless communication system.

According to a first aspect there is presented a method for assigning channels to end-nodes in a wireless communication system. The method is performed by a network controller of the wireless communication system. The method comprises classifying each available channel in the wireless communication system into one of multiple channel categories according to performance and usability characteristics of each available channel. The method comprises ranking the channels per each category. The method comprises assigning, according to the channels as ranked, at least one of the channels to each of the end-nodes. The method comprises providing, in a channel list and to the end-nodes, information of which at least one channel has been assigned to each end-node.

According to a second aspect there is presented a network controller for assigning channels to end-nodes in a wireless communication system. The network controller comprises processing circuitry. The processing circuitry is configured to cause the network controller to classify each available channel in the wireless communication system into one of multiple channel categories according to performance and usability characteristics of each available channel. The processing circuitry is configured to cause the network controller to rank the channels per each category. The processing circuitry is configured to cause the network controller to assign, according to the channels as ranked, at least one of the channels to each of the end-node. The processing circuitry is configured to cause the network controller to provide, in a channel list and to the end-nodes, information of which at least one channel has been assigned to each end-node.

According to a third aspect there is presented a network controller for assigning channels to end-nodes in a wireless communication system. The network controller comprises a classify module configured to classify each available channel in the wireless communication system into one of multiple channel categories according to performance and usability characteristics of each available channel. The network controller comprises a rank module configured to rank the channels per each category. The network controller comprises an assign module configured to assign, according to the channels as ranked, at least one of the channels to each of the end-node. The network controller comprises a provide module configured to provide, in a channel list and to the end-nodes, information of which at least one channel has been assigned to each end-node.

According to a fourth aspect there is presented a computer program for assigning channels to end in a wireless communication system, the computer program comprising computer program code which, when run on a network controller, causes the network controller to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this provides efficient assignment of channels to the end-nodes in the wireless communication system.

Advantageously this gives assurance that the wireless communication system is in the best position to guarantee safety, availability and performance.

Advantageously this enables the use of licensed spectrum for emergency messages in case of interference/jamming.

According to some aspects, also the following advantages are obtained:

Fast channel adaptation, enabling effective reaction to interference in the wireless communication system for time critical control applications.

Rapid channel switching, ensuring network availability without giving up performance.

High availability and reliability in industrial communication applications is ensured.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, action, etc." are to be interpreted openly as referring to at least one instance of the element, apparatus, component, means, module, action, etc., unless explicitly stated otherwise. The actions of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION OF ILLUSTRATIVE EMBODIMENTS

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any action or feature illustrated by dashed lines should be regarded as optional.

Figure 1:
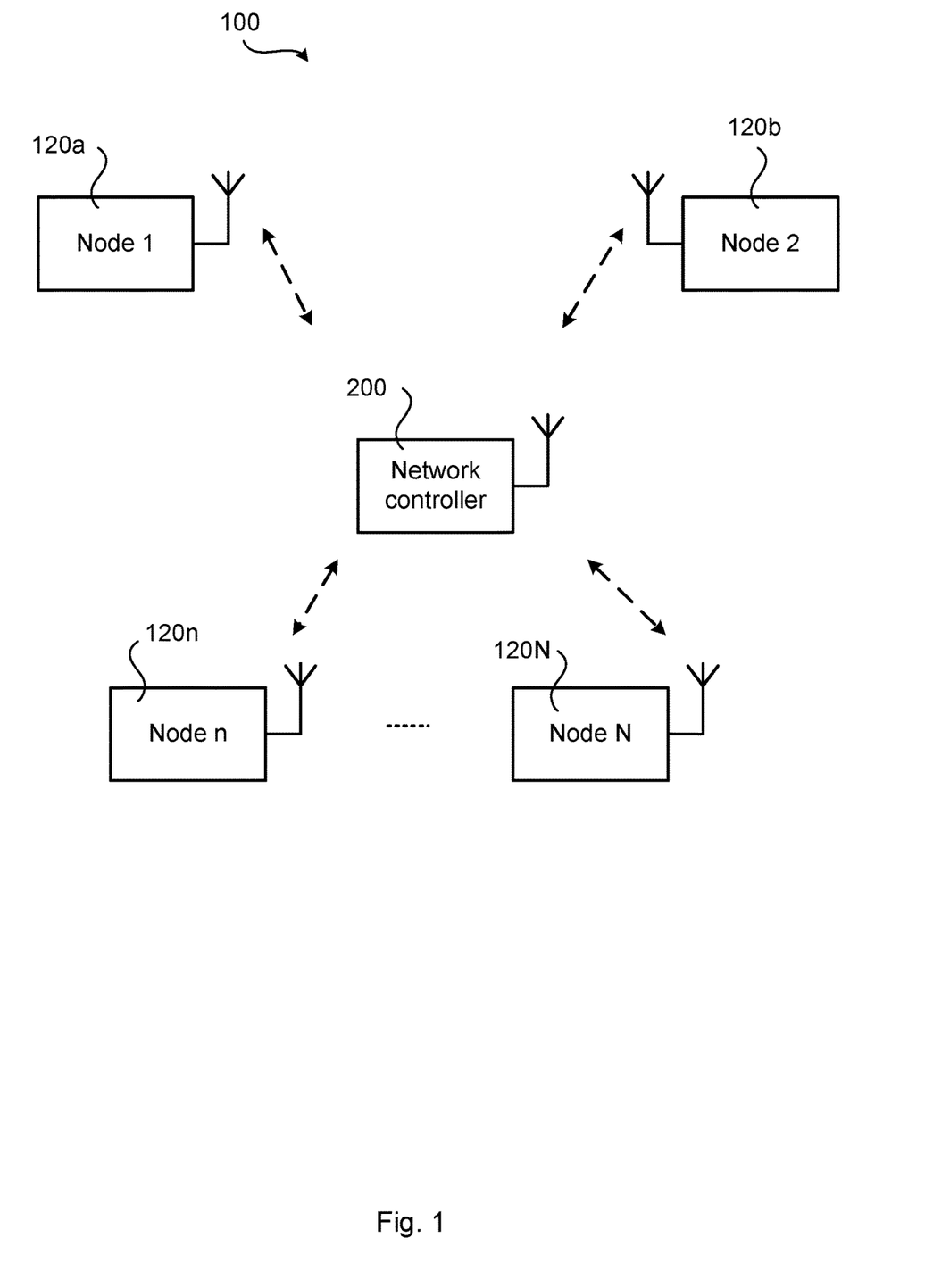
FIG. 1 is a schematic diagram illustrating a wireless communication system according to embodiments.

FIG. 1 is a schematic diagram illustrating a wireless communication system 100 where embodiments presented herein can be applied. In some examples the wireless communication system 100 is a wireless industrial communication system. The wireless communication system 100 comprises network entities denoted as end-nodes 120a, 120b, 120n, . . . , 120n, . . . , 120N, each equipped with a flexible radio-frequency (RF) front-end enabling the end-nodes to communicate with a network controller 200 over different frequency bands. For example, the end-nodes 120a-120N might represent different components of a substation automation system (e.g., gateways, breakers, protections, or any combination thereof, etc.) exchanging control messages. The network controller 200 might be part of, integrated with, or collocated with, a spectrum monitoring node or a master node of the wireless communication system 100.

As noted above, there is still a need for improved mechanisms for assigning channels to the end-nodes 120a-120N in the wireless communication system 100. As will be further disclosed below, the network controller 200 is therefore configured to monitor, classify, and rank the channels to be used for communication by each end-node 120a-120N and to distribute this information to the end-nodes 120a-120N in the wireless communication system 100.

The embodiments disclosed herein in particular relate to mechanisms for assigning channels to end-nodes 120a-120N in a wireless communication system 100. In order to obtain such mechanisms there is provided a network controller 200, a method performed by the network controller 200, a computer program product comprising code, for example in the form of a computer program, that when run on a network controller 200, causes the network controller 200 to perform the method.

Figure 2:
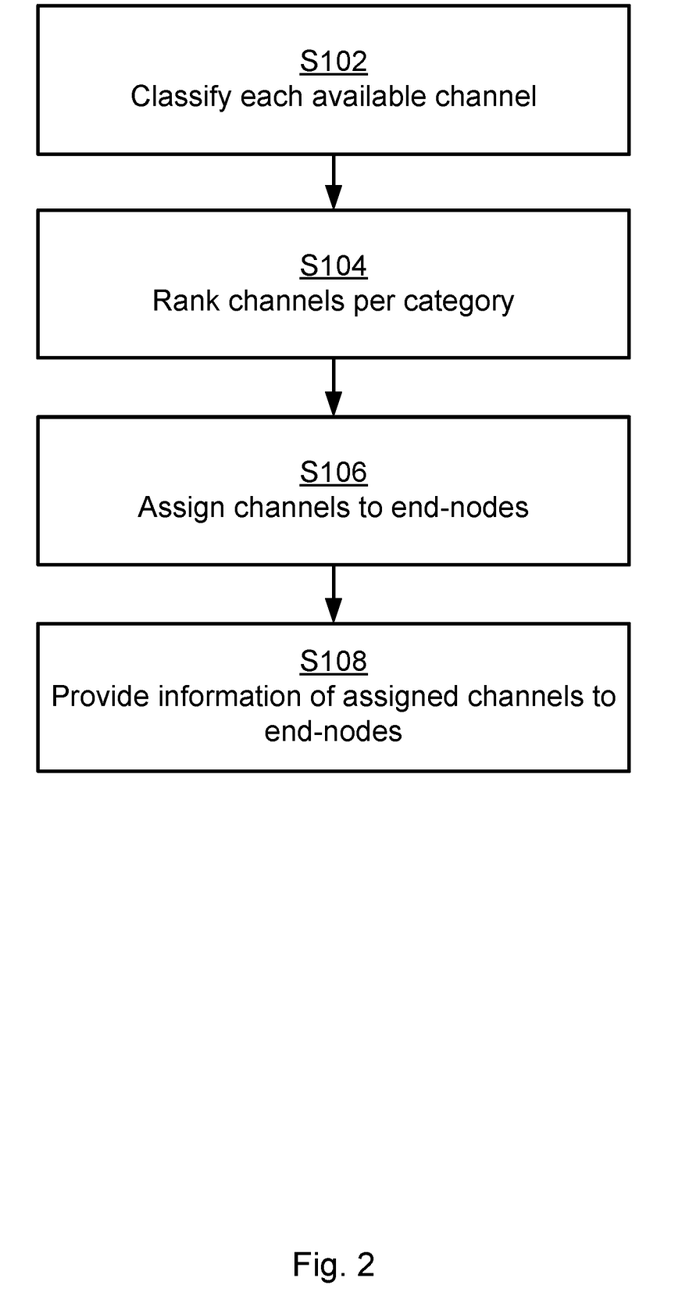
FIGS. 2, 4, and 5 are flowcharts of methods according to embodiments.

FIG. 2 is a flowchart illustrating embodiments of methods for assigning channels to end-nodes 120a-120N in a wireless communication system 100. The methods are performed by the network controller 200. The methods are advantageously provided as computer programs 720.

The method is based on exploiting all the frequency bands in the frequency spectrum covered by the hardware in transmitters and receivers of the end-nodes 120a-120N in the wireless communication system 100. The available channels, each occupying a respective operational frequency band, are classified according to two metrics: performance and usability. Hence, the network controller 200 is configured to perform action S102.

In action S102 the network controller 200 classifies each available channel in the wireless communication system wo into one of multiple channel categories according to performance and usability characteristics of each available channel.

In more detail, performance characteristics of a channel generally refers to how well control application requirements (e.g., cycle time, data size, communication range, etc.) as run by the end-nodes 120a-120N can be satisfied in a given channel. This is impacted by two factors: the wireless link quality (e.g., defined, or measured, in terms of signal to interference ratio (SIR), signal to noise ratio (SNR), packet error rate, etc.) and possible restrictions to the transmission parameters (e.g., defined, or measured, in terms of power, bandwidth, duty cycle) imposed by spectrum regulations in a given geographical area.

Usability characteristics of a channel, in contrast thereto, generally refers to how much and how long a channel can be used by the control applications as run by the end-nodes 120a-120N. Specifically, it refers to the licensing policy of the channel, which can allow license-exempt use, exclusive use of spectrum or spectrum sharing, with the last case indicating a situation in which a mobile network operator or another third-party entity delivering spectrum management services sublease a licensed portion of the spectrum to a private network in a limited area, possibly for a short period of time (see, for example ETSI TS 103 588: "Reconfigurable Radio Systems (RRS); Feasibility study on temporary spectrum access for local high-quality wireless networks"). In addition to the licensing policy, spectrum regulations might also impact the usability of a channel, for example by imposing listen-before-talk mechanisms or limiting the transmission time. Moreover, a first rough estimation of the achievable performance might be performed, comparing the required cycle time and the allowed duty cycle in each channel.

Based on these characteristics, each available channel is thus classified into one of multiple channel categories.

Further, the channels within each category are ranked. Hence, the network controller 200 is configured to perform action S104, where the network controller 200 ranks the channels per each category.

In some examples each channel has a respective performance metric and the channels within each category are ranked in descending order from the channel having highest performance metric to the channel having lowest performance metric. The performance metric relates to throughput, signal quality, etc., of the channel. Further aspects of how the channels might be ranked will be provided below.

The thus ranked channels are then assigned to the end-nodes 120a-120N. Hence, the network controller 200 is configured to perform action S106. In action S106 the network controller 200 assigns, according to the channels as ranked (i.e., the thus ranked channels), at least one of the channels to each of the end-nodes 120a-120N.

The end-nodes 120a-120N are then made aware of the assigned channels. Hence, the network controller 200 is configured to perform action S108. In action S108 the network controller 200 provides, in a channel list and to the end-nodes 120a-120N, information of which at least one channel has been assigned to each end-node 120a-120N.

Subsequent communication between the network controller 200 and each end-node 120a-120N might then be performed in the at least one channel assigned to that end-node 120a-120N.

Figure 3:
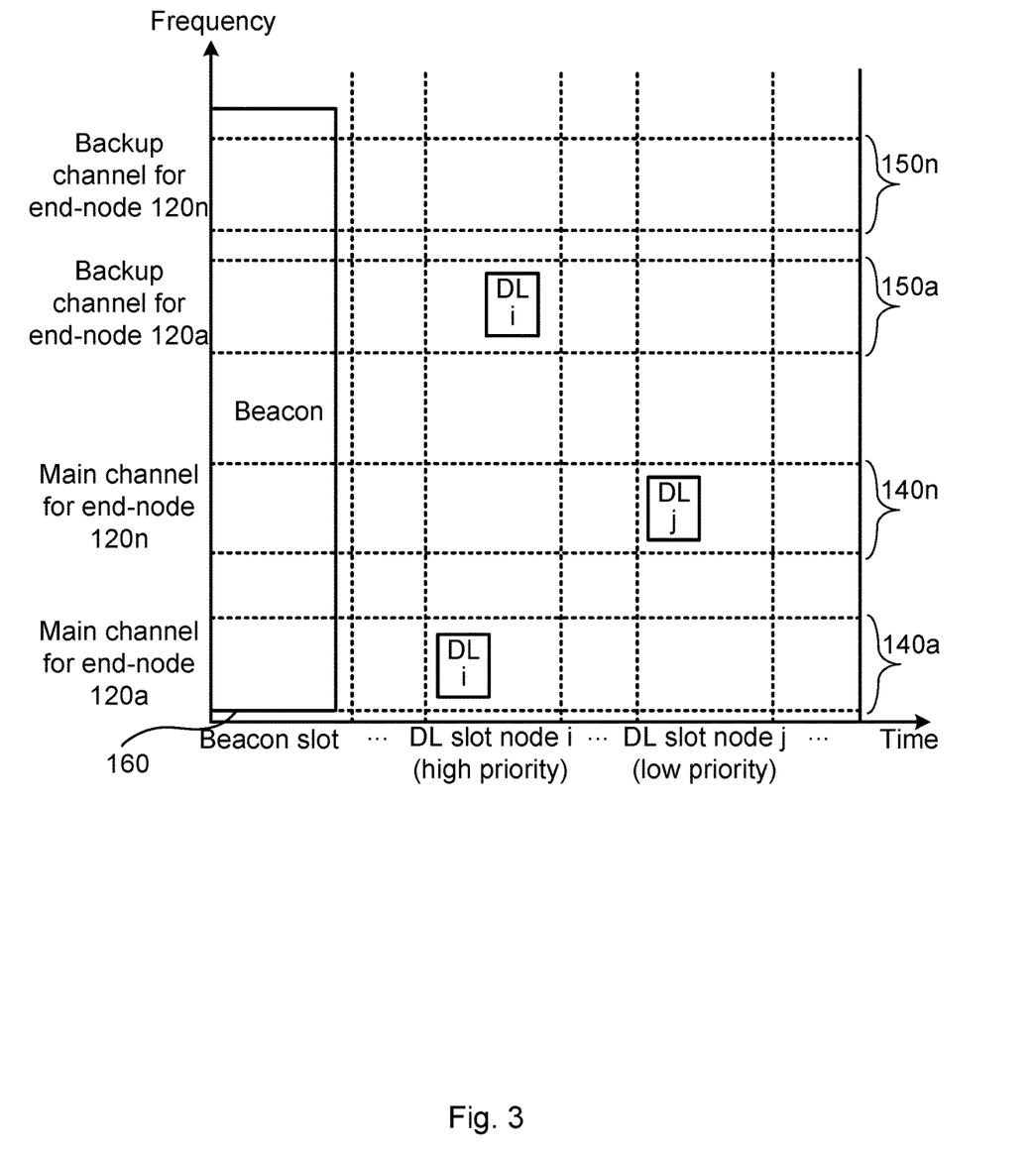
FIG. 3 schematically illustrates channel assignment to two nodes according to an embodiment.

FIG. 3 is a schematic time/frequency illustration of channels assigned to two end-nodes 120a, 120n, where each of the end-nodes 120a, 120n is assigned one main channel 140a, ion and one back-up channel 150a, 150n, and where both the main channel 140a and the back-up channel 150a are utilized for the communication for end-node 120a whereas for end-node 120n only its assigned main channel 150n is utilized for communication. In the example of FIG. 3, the channel list is provided in a beacon 160 as transmitted in a beacon slot.

Embodiments relating to further details of assigning channels to end-nodes 120a-120N in a wireless communication system 100 as performed by the network controller 200 will now be disclosed.

Further aspects of how the channels might be ranked will now be disclosed.

The channels within each category might be ranked with respect to the extent to which they meet the performance requirements of the control application. For example, a control application might require a certain number of end-nodes 120a-120N to transmit and receive packets of a certain length, with a certain periodicity, a certain latency constraint, and/or a certain (maximum) packet loss rate.

In order to rank the channels, the total required occupation of the channel from the control application requirements might be determined and checked if such occupation is allowed by the regulations (usability). Then, the obtainable latency and packet loss rate might be simulated given the measured quality of the channel (performance). The quality might be expressed, for example, in terms of signal-to-interference-plus-noise ratio (SINR). Relations between SINR, data rate, and packet loss probability can be derived through theoretical analysis, numerical simulations or controlled measurements. In some aspects, such relations are determined by the network controller 200. In other aspects, information of such relations are obtained by the network controller 200 from a computational entity.

If, after these calculations, it emerges that the requirements can be fully satisfied, the highest possible score (say, 100% if the scale is in terms of percentage) is assigned to that channel. Otherwise, a lower score is assigned to that channel based on how much the achievable performance differ from the requirements. This procedure is repeated for all available channels such that all channels can be ranked base on their scores.

In some embodiments, each of the end-nodes 120a-120N is allocated as highly ranked channel as possible. In case each channel only has limited capability and all end-nodes 120a-120N thus cannot be assigned one and the same channel, the channels might be assigned according to requirements of control applications run by the end-nodes 120a-120N such that end-nodes 120a-120N running control applications with high requirements in terms of latency and availability are assigned higher ranked channels than end-nodes 120a-120N running control applications with lower such requirements.

In some embodiments, at least one of the end-nodes 120a-120N is allocated channels from at least two of the categories, or at least two channels from within one and the same category. For example, at least one of the end-nodes 120a-120N might have more than one channel assigned to it to perform frequency hopping or frequency diversity when using the channels for communication in the wireless communication system 100. As the skilled person understands, frequency hopping generally refers to communication nodes, such as the end-nodes 120a:120N, using different frequencies to transmit different packets at different times whilst frequency diversity generally refers to communication nodes using different frequencies to transmit the same packet at the same time (i.e., parallel transmission).

In some embodiments, during operation, the channels assigned to each end-node 120a-120N are periodically updated, by means of the channels inside the categories being re-ranked, based on changed performance and usability characteristics of each available channel.

According to some embodiments, there are three channel categories in total; operational channels, occasional channels, and emergency channels. According to the combination of the performance and usability metrics, every channel included in the frequency spectrum might thus be categorized into one of these three categories. Aspects of these channel types will be disclosed hereinafter.

The operational channel is characterized by yielding full performance; the link quality and spectrum regulations allows to fully meet the requirements of the control applications as run by the end-nodes 120a-120N, and having full usability. The channel is either license-exempt or permanently subleased to the control applications as run by the end-nodes 120a-120N.

The channels in the license-free industrial, scientific and medical (ISM) radio bands at 2.4 GHz, 5 GHz and 60 GHz are examples of this type of channel, provided the application requirements can be met with the available link quality and under the spectrum regulations in the area where the wireless communication system 100 is deployed.

The occasional channel is characterized by yielding full performance; the link quality and spectrum regulations allow to fully meet the requirements of the control applications as run by the end-nodes 120a-120N, but having only partial usability. The channel is subleased to the control applications for a limited period of time, and/or frequency regulations do not allow the applications to continuously access the channel in the time domain.

Television white spaces (TVWS) are example of occasional channels. Indeed, though TVWS are license-exempt frequency bands, the access is regulated by the White Space Database (WSDB), which provides updated information on the available channels and other restrictions, such as power limit. The network controller 200 might therefore be configured to access the WSDB to determine the locations of the available channels whose restrictions allow to meet the application requirements (see, Oh, S. W., Ma, Y., Tao, M. H., and Peh, E. C. Y.: "An overview and comparison of TV white space regulations worldwide", International Conference on Frontiers of Communications, Networks and Applications (ICFCNA), Malaysia, 2014).

Another example of occasional channels relates to spectrum sharing for providing local area services with a certain quality of service (QoS) over licensed spectrum. The network controller 200 is then configured to provide information of local wireless communication service requirements to the Operation, Administration, and Maintenance (OAM) of a Mobile Network Operator (MNO) or third-party operator, and the latter will consider all the requests in a local area and issue access rights to each network with a defined frequency range in a geographic area for a limited period of time, together with transmission regulations that the private network (as defined by the wireless communication system 100) must observe.

The emergency channel is characterized by yielding only limited performance; either the link quality or the spectrum regulations (or both) do not allow to fully meet the requirements of the control applications as run by the end-nodes 120a-120N, and having only partial or even no usability; the channel cannot be used continuously by the control application, either due to licensing policy or to spectrum regulations.

Example of emergency channels with partial usability are channels around 868 MHz, a license-exempt band in Europe with strong regulations in terms of duty cycle, transmission power and bandwidth. The duty cycle, defined as the maximum ratio of time on the air per hour, is as low as 1% in the 865-868.6 MHz sub-band, which means that each end-node 120a-120N is allowed to transmit during a total amount of only 36 seconds per hour. Several industrial control applications cannot fully meet their requirements under this constraint and hence this channel cannot be considered as operational or occasional. However, alerts and alarm packets might be transmitted in emergency channels if other channels are temporarily not available.

Emergency channels with no usability are licensed spectrum, for example channels dedicated to cellular communications. In extreme cases, where bad channel states can lead to failures in the control systems that result in hazards for the safety of people or property, it could be useful to transmit alarm messages in emergency channels without being licensed to do so (or only after negotiations to be licensed to do so).

There could be different ways to assign the channels to the end-nodes 120a-120N. In some embodiments, when the operational channels category is not empty, the top-ranked channels among the operational channels are assigned to the end-nodes 120a-120N, and when the operational channels category is empty, and the occasional channels category is not empty, the top-ranked channels among the occasional channels are assigned to the end-node 120a-120N. In some embodiments, when the operational channels and occasional channels categories are both empty, then for any end-node 120a-120N having a message to be delivered that carries safety or emergency information, the top-ranked channels among the emergency channels are assigned to that end-node 120a-120N, and otherwise current channels assignments are maintained.

Hence, in some aspects, the following three conditions apply:

Condition 1: If the operational channels category is not empty, the top-ranked channels among the operational channels are assigned to the end-nodes 120a-120N.

Condition 2: If the operational channels category is empty, and the occasional channels category is not empty, the top-ranked channels among the occasional channels are assigned to the end-nodes 120a-120N.

Condition 3: If the operational channels and the occasional channels categories are both empty, it depends whether any message to be delivered carries safety or emergency information. If so, the top-ranked channels among the emergency channels are assigned to the end-nodes 120a-120N, and otherwise the current channels assignment is maintained.

Figure 5:
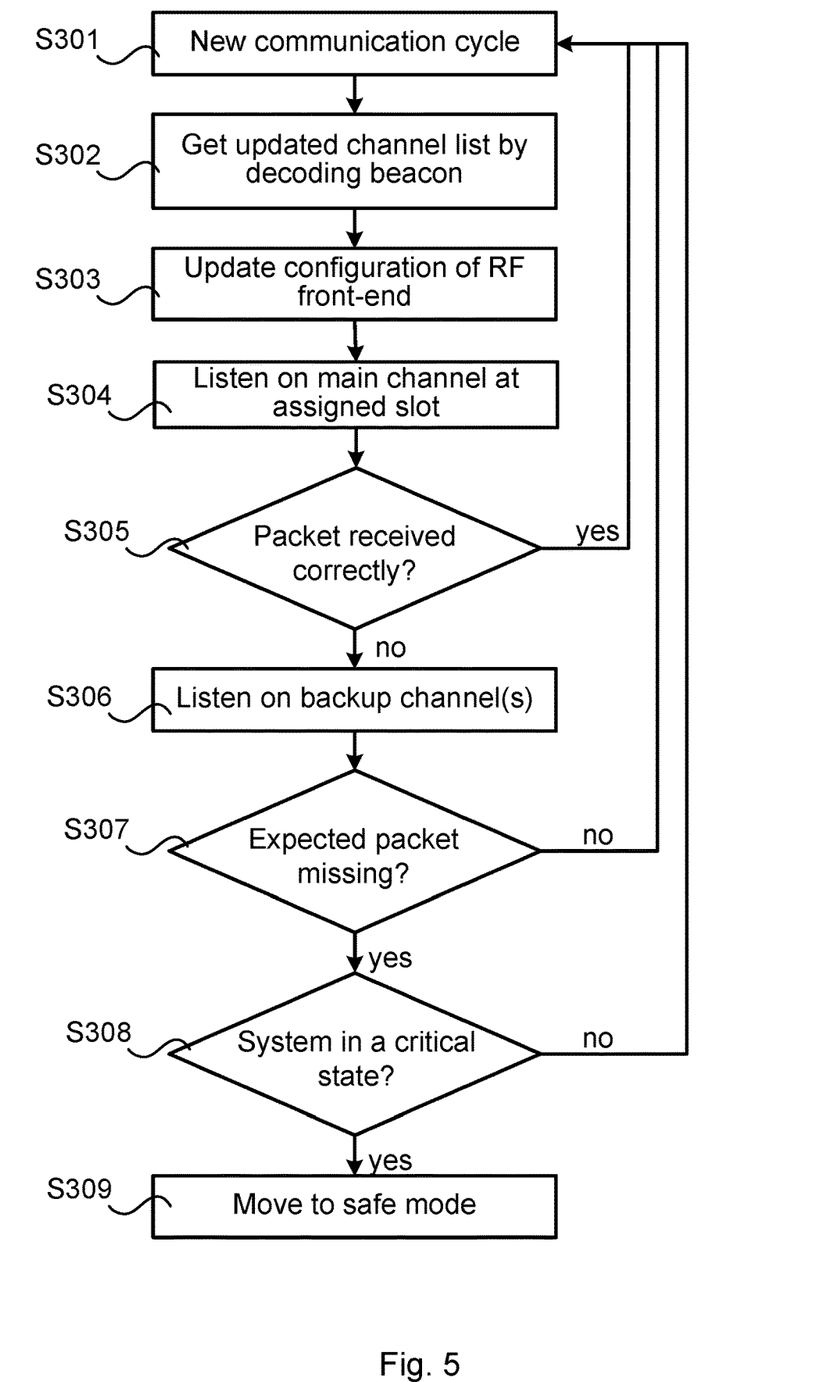

Further, in some embodiments, a switch to safe mode is to be performed by any end-node 120a-120N running a control application in a critical state and that is expecting, but not receiving, the message that carries safety or emergency information (see below action S308).

Figure 4:
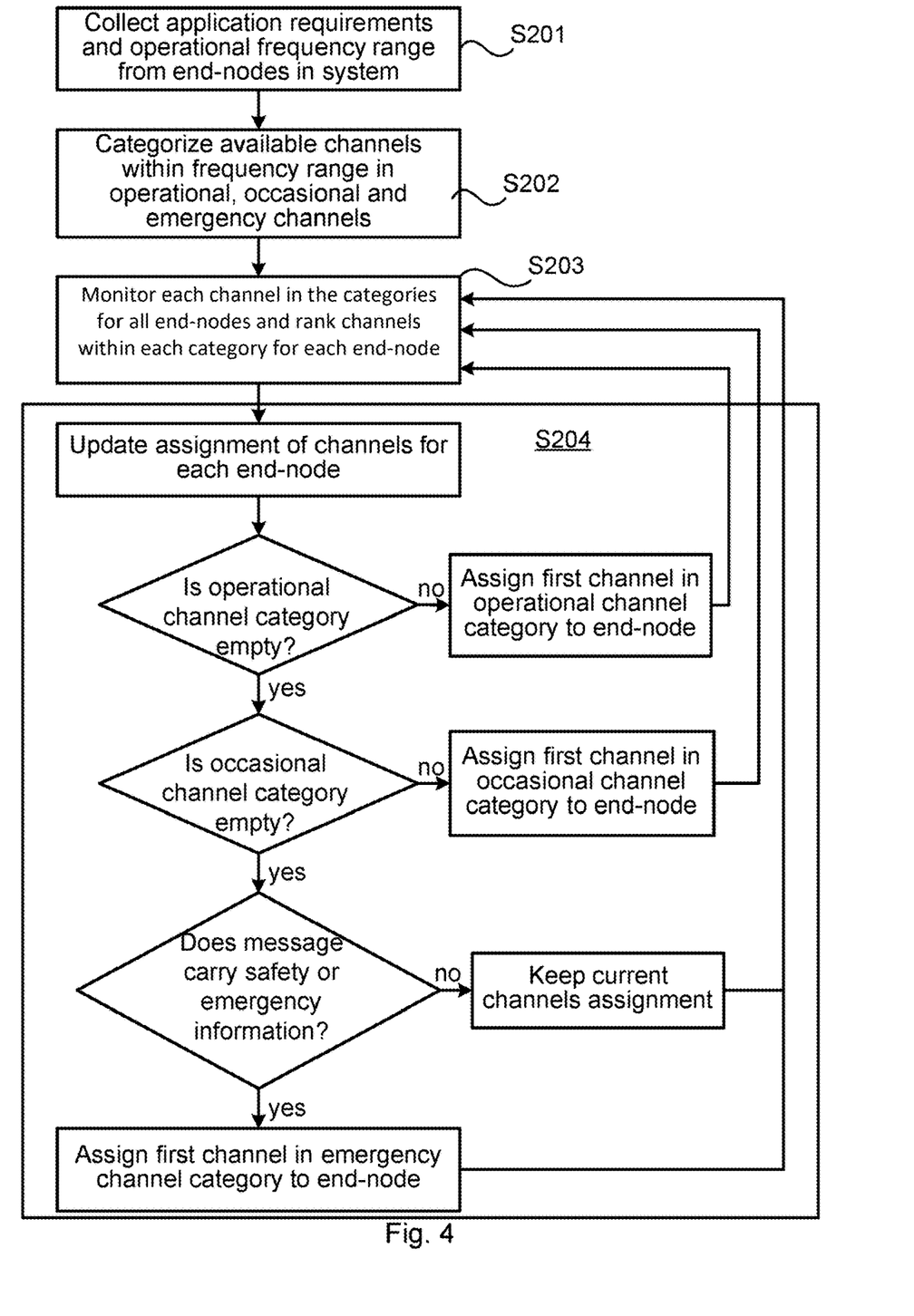

Reference is made to the flowchart of FIG. 4 illustrating one illustrative example for assigning channels to the end-nodes 120a-120N based on the above embodiments.

S201: The network controller 200 collects control application requirements (including cycle time, packet size, reliability), and the operational frequency range of each end-node 120a-120N in the wireless communication system 100 (i.e., the portion of the spectrum which can be covered by the end-nodes' 120a-120N hardware). Since this step is performed offline, when the network is in a controlled environment, the end-nodes 120a-120N can use a common channel to send information on their application requirements and frequency range to the network controller 200.

S202: Before operation, for each end-node 120a-120N, based on the requirements and frequency range collected in S201, the network controller 200 determines usability of each frequency band based on licensing policies and spectrum regulations.

S203: During operation, the network controller 200 periodically monitors all available channels and collects information on the link qualities for each end-node 120a-120N, e.g., in terms of Received Signal Strength Indicator (RSSI), and patterns of interfering transmissions, etc. Combined with the restrictions on maximum transmission power and bandwidth, a full estimation of the achievable performance is performed by the network controller 200. Based on this estimation, the channels might be re-categorized, and thus moved across the categories, and the channels within each category re-ranked, so that the channel providing the best performance is ranked first per category. The end-result is an updated channel list.

S204: During operation, the network controller 200 periodically updates the channel list, and thus updates the channels assigned to each end-node 120a-120N for transmission. As noted above, an end-node 120a-120N might have more than one channel assigned to it, e.g., to perform frequency hopping or frequency diversity.

After the update in action S204, action S203 is entered again.

Estimating interfering patterns could be computationally complex due to the unpredictable nature of the underlying transmissions causing the interference. Algorithms based on artificial intelligence (AI) techniques can be used to learn and predict the interfering patterns on each channel. In detail, the network controller 200 might periodically scan all available channels and record the received signal power against time. The network controller 200 might also subtract from these records the received power originated from transmissions by end-nodes 120a-120N in its own network, whose patterns are known. The resulting patterns of power over time might be used as inputs to AI algorithms, such as long short-term memory (LSTM) recurrent neural networks. These algorithms will then output a prediction of the interference pattern over time, which will be used by the network controller 200 to update the ranking of the channels.

The AI algorithms employed for interference estimation might be trained before operations. This can be achieved by having the end-nodes 120a-120N performing test transmissions in a controlled environment. During the training, the network controller 200 will consider these patterns as interference and train the AI algorithm by comparing its predictions against the real transmission patterns. This interference prediction process is purely data driven but can be further improved embedding known information. For example, the network controller 200 could be able to classify some predicting patterns as specific networks (e.g., beacons of a WiFi network) and hence increase its accuracy in predicting future patterns. Moreover, the network controller 200 could also check the accuracy of its prediction a posteriori by comparing the predicted channel quality with the outcome of the transmission (packet correctly decoded or corrupted), and using this information to reinforce the neural network.

Aspects of rapid channel adaptation will now be disclosed. It might be assumed both the network controller 200 and the end-nodes 120a-120N are configured to communicate on a wide range of channels in the frequency range as allowed, for example, by software-defined radio (SDR) technology. Moreover, it might be assumed that all end-nodes 120a-120N are configured to quickly detect strong interference on any channel during their normal operation, for example by hardware-based RF detectors and/or software-based methods relating to wireless link performance.

Mechanisms for rapid frequency adaptation involves operations in both the network controller 200 and the end-nodes 120a-120N. Specifically, the network controller 200 is responsible to monitor the channels and maintain a list of available channels (above referred to as a channel list) for each end-node 120a-120N. In further aspects, the network controller 200 might for each end-node 120a-120N define one main channel as the best channel in the list and (at least) one backup channel as the second-best channel in the list and communicate this information to the end-nodes 120a-120N in a beacon or by other wireless means. Subsequently, when downlink data is sent from the network controller 200 to the end-nodes 120a-120N, the network controller 200 uses the main channel for communication and might replicate the same message in the backup channel, if the message is considered as high-priority. As soon as the network controller 200 detects interference in the main channel or in (one of) the backup channel(s), the channel list is updated to remove the interfered channel and this information is communicated in the next beacon, or other wireless means.

At each end-node 120a-120N, the following process is followed at each communication cycle, as illustrated in the flowchart of FIG. 5.

S301: A new communication cycle is entered.

S302: The end-node 120a-120N receives an updated channel list of assigned channels from the network controller 200 by decoding a beacon received in the initial slot of the communication cycle and thus retrieves the channel list.

S303: The end-node 120a-120N updates the configuration of its RF front-end according to the assigned one or more channels. The end-node 120a-120N is then thus ready to receive signals in the main channel and any backup channel(s).

S304: The end-node 120a-120N listens for packets from the network controller 200 on the main channel, as assigned.

S305: If a packet is received correctly, the end-node 120a-120N will proceed to the next communication cycle. Action S301 is thus entered for the next communication cycle.

S306: If an expected packet is missing, the end-node 120a-120N will listen in turn to any backup channels. Since these channels have already been configured in the end-node 120a-120N, the end-node 120a-120N only has to wait the lock time of its phase lock loop (PLL) to listen on the frequency of the backup channel.

S307, S308: In case the expected packet is not received in the backup channel(s) either, the end-node 120a-120N checks if its run control application is in a critical state (this can be triggered, for example, by a certain number of consecutive missed packets) or not, and thus if the end-node 120a-120N is to move to a safe mode or not. If yes, action S309 is entered, and else action S301 is entered for the next communication cycle.

S309: In this safe mode, the end-node 120a-120N stops any safety-critical process, and an alarm is raised to request the intervention of an operator.

Further, in case the quality of both the main and backup channels is bad, before moving to the safe state, the end-node 120a-120N might be configured to in its receiver try to combine the received information on the different channels in order to seek to reconstruct the packet of the current communication cycle. This technique is similar to soft combining used in hybrid automatic repeat request (HARQ) systems in cellular networks, with the difference that in conventional HARQ schemes, multiple copies of the same packet are sent consecutively over time until the original packet is recovered through soft combining, whereas as herein proposed the different copies of the packet are sent simultaneously over different channels and soft combining is applied once on all the received copies (where different weights can be assigned in the receiver to each received copy based on estimated channel quality).

Using the proposed method for rapid frequency adaptation, the time gap required by channel switching is greatly reduced. For example, considering an SDR platform equipped with the AD9361 transceiver, 8 frequency configurations for transmitter and receiver can be set and switching from one configuration to another takes only a PLL lock time around 15-20 μs (microseconds). In the worst case in which a new channel has to be used which is not within the 8 configurations, it takes around 60 μs to set a new frequency.

Figure 6:
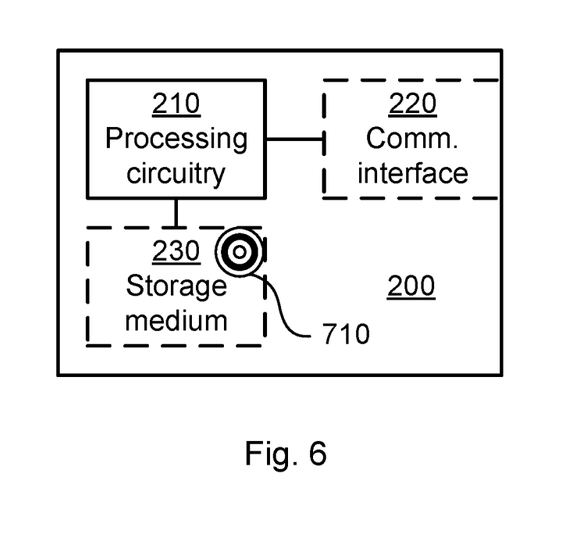
FIG. 6 is a schematic diagram showing functional units of a network controller according to an embodiment.

FIG. 6 schematically illustrates, in terms of a number of functional units, the components of a network controller 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 710 (as in FIG. 7), e.g., in the form of a storage medium 230. The processing circuitry 210 may further be provided as at least one application specific integrated circuit (ASIC), or field programmable gate array (FPGA).

Particularly, the processing circuitry 210 is configured to cause the network controller 200 to perform a set of operations, or actions, as disclosed above. For example, the storage medium 230 may store the set of operations, and the processing circuitry 210 may be configured to retrieve the set of operations from the storage medium 230 to cause the network controller 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network controller 200 may further comprise a communications interface 220 at least configured for communications with the end-nodes 120a: 120N as well as with other entities, functions, nodes, and devices. As such the communications interface 220 may comprise one or more transmitters and receivers, comprising analogue and digital components. The processing circuitry 210 controls the general operation of the network controller 200, e.g., by sending data and control signals to the communications interface 220 and the storage medium 230, by receiving data and reports from the communications interface 220, and by retrieving data and instructions from the storage medium 230. Other components, as well as the related functionality, of the network controller 200 are omitted in order not to obscure the concepts presented herein.

Figure 7:
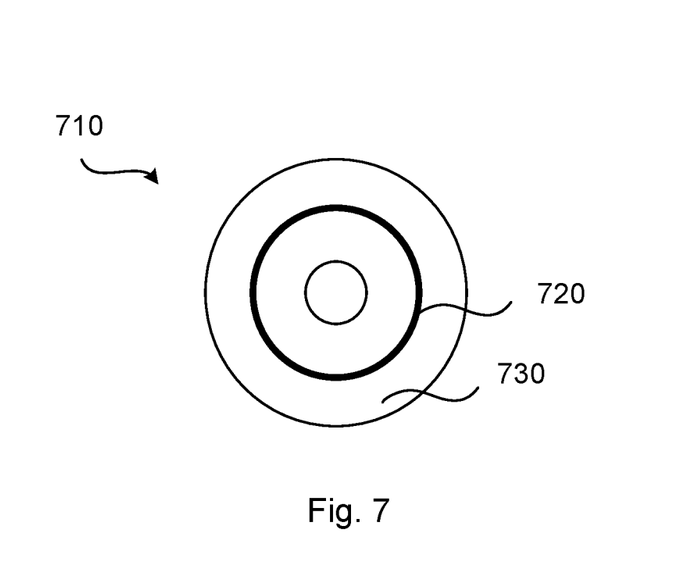
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 210 and thereto operatively coupled entities and devices, such as the communications interface 220 and the storage medium 230, to execute methods according to embodiments described herein. The computer program 720 and/or computer program product 710 may thus provide means for performing any actions as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for assigning channels to end-nodes in a wireless communication system, the method being performed by a network controller of the wireless communication system, the method comprising:
classifying each available channel in the wireless communication system into one of multiple channel categories according to performance and usability characteristics of each available channel, wherein the multiple channel categories comprise operational channels for channels that have full performance and full usability, occasional channels for channels that have full performance and partial usability, and emergency channels for channels that have limited performance and partial or no usability;
ranking the channels per each category;
assigning, according to the channels as ranked, at least one of the channels to each of the end-nodes; and
providing, in a channel list and to the end-nodes, information of which at least one channel has been assigned to each end-node.

2. The method according to claim 1, wherein subsequent communication between the network controller and each end-node is performed in the at least one channel assigned to that end-node.

3. The method according to claim 1, wherein each of the end-nodes is allocated as highly ranked channel as possible.

4. The method according to claim 1, wherein at least one of the end-nodes is allocated channels from at least two of the categories or at least two channels are from within one and the same category.

5. The method according to claim 1, wherein at least one of the end-nodes has more than one channel assigned to it for that at least one of the end-nodes to perform frequency hopping or frequency diversity when using the channels for communication in the wireless communication system.

6. The method according to claim 1, wherein, during operation, the channels assigned to each end-node are periodically updated, by means of the channels inside the categories being re-ranked, based on changed performance and usability characteristics of each available channel.

7. The method according to claim 1, wherein, when the operational channels category is not empty, top-ranked channels among the operational channels are assigned to the end-node and when the operational channels category is empty and the occasional channels category is not empty, the top-ranked channels among the occasional channels are assigned to the end-node.

8. The method according to claim 7, wherein, when the operational channels and occasional channels categories are both empty, then for any end-node having a message to be delivered that carries safety or emergency information, the top-ranked channels among the emergency channels are assigned to that end-node, and otherwise current channels assignments are maintained.

9. The method according to claim 8, further comprising switching to safe mode by any end-node running a control application in a critical state and that is expecting, but not receiving, the message that carries the safety or emergency information.

10. The method according to claim 1, wherein the performance characteristics of each channel are based on how well control application requirements, as run by the end-nodes, can be satisfied in each channel, the control application requirements comprising cycle time, data size, and/or communication range.

11. The method according to claim 10, wherein the better the control application requirements can be satisfied in a given available channel, the higher this given available channel is ranked in its category.

12. The method according to claim 1, wherein the usability characteristics of each channel are based on spectrum regulations and licensing policy that pertain to how much each channel can be used by a control application as run by the end-nodes and how long each channel can be used by the control application as run by the end-nodes.

13. The method according to claim 12, wherein the more frequent a given available channel can be used by the control application as run by the end-nodes and the longer the given available channel can be used by the control application as run by the end-nodes, the higher this given available channel is ranked in its category.

14. The method according to claim 1, wherein the network controller is part of a spectrum monitoring node or a master node of the wireless communication system.

15. The method according to claim 1, wherein the end-nodes are gateways, breakers, protections, or any combination thereof, in the wireless communication system.

16. The method according to claim 1, wherein the wireless communication system is a wireless industrial communication system.

17. A network controller for assigning channels to end-nodes in a wireless communication system, the network controller comprising processing circuitry, the processing circuitry being configured to cause the network controller to:
classify each available channel in the wireless communication system into one of multiple channel categories according to performance and usability characteristics of each available channel, wherein the multiple channel categories comprise operational channels for channels that have full performance and full usability, occasional channels for channels that have full performance and partial usability, and emergency channels for channels that have limited performance and partial or no usability;
rank the channels per each category;
assign, according to the channels as ranked, at least one of the channels to each of the end-nodes; and
provide, in a channel list and to the end-nodes, information of which at least one channel has been assigned to each end-node.

18. The network controller according to claim 17, wherein the network controller is part of a spectrum monitoring node or a master node of the wireless communication system.

19. A non-transitory computer readable medium storing a computer program for assigning channels to end-nodes in a wireless communication system, the computer program comprising computer code which, when run on processing circuitry of a network controller, causes the network controller to:
- classify each available channel in the wireless communication system into one of multiple channel categories according to performance and usability characteristics of each available channel, wherein the multiple channel categories comprise operational channels for channels that have full performance and full usability, occasional channels for channels that have full performance and partial usability, and emergency channels for channels that have limited performance and partial or no usability;
- rank the channels per each category;
- assign, according to the channels as ranked, at least one of the channels to each of the end-nodes; and
- provide, in a channel list and to the end-nodes, information of which at least one channel has been assigned to each end-node.

* * * * *